(12) United States Patent
Kruglick

(10) Patent No.: US 9,773,293 B2
(45) Date of Patent: Sep. 26, 2017

(54) COMPOSITION DATA DISPATCHER

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 334 days.

(21) Appl. No.: 14/375,296

(22) PCT Filed: Dec. 24, 2013

(86) PCT No.: PCT/US2013/077661
§ 371 (c)(1),
(2) Date: Jul. 29, 2014

(87) PCT Pub. No.: WO2015/099702
PCT Pub. Date: Jul. 2, 2015

(65) Prior Publication Data
US 2015/0178880 A1    Jun. 25, 2015

(51) Int. Cl.
*G06T 1/20* (2006.01)
*G06T 15/00* (2011.01)
*G09G 5/36* (2006.01)

(52) U.S. Cl.
CPC ............................... *G06T 1/20* (2013.01)

(58) Field of Classification Search
CPC .............................. G06T 1/20; G06K 9/00771
See application file for complete search history.

(56) References Cited

U.S. PATENT DOCUMENTS

2012/0299938 A1    11/2012  Iwasaki
2013/0120368 A1*    5/2013  Miller ................. G06T 15/00
                                               345/419
(Continued)

OTHER PUBLICATIONS

Demerjian, C., "AMD announces Sky, the new cloud gaming line," accessed at http://web.archive.org/web/20130813222218/http://semiaccurate.com/2013/03/27/amd-announces-sky-the-new-cloud-gaming-line/, Mar. 27, 2013, pp. 3.
(Continued)

*Primary Examiner* — Sing-Wai Wu
(74) *Attorney, Agent, or Firm* — Moritt Hock & Hamroff LLP; Steven S. Rubin, Esq.

(57) ABSTRACT

Technologies are generally described for methods and systems effective to associate composition data with a graphics processing unit so that a corresponding model may be manipulated and an image produced. According to some examples, the methods may include receiving, by a dispatcher, first composition data that corresponds to a first model. The methods may also include associating, by the dispatcher, the first composition data with a first graphics processing unit. The methods may also include receiving, by the dispatcher, second composition data that corresponds to a second model. The methods may include determining, by the dispatcher, that the second model is stored in a second graphics processing unit different from the first graphics processing unit. The methods may also include associating, by the dispatcher, the second composition data with the second graphics processing unit based on the determination that the second model is stored in the second graphics processing unit.

18 Claims, 8 Drawing Sheets

(56) References Cited

U.S. PATENT DOCUMENTS

| | | |
|---|---|---|
| 2013/0159596 A1 | 6/2013 | Van De Ven et al. |
| 2013/0176319 A1* | 7/2013 | Westerhoff ................ G06F 3/14 345/502 |
| 2013/0321455 A1 | 12/2013 | Fink et al. |

OTHER PUBLICATIONS

"AMD FirePro™ Graphics for Cloud + Data Centers," accessed at http://web.archive.org/web/20131203125539/http://www.amd.com/US/PRODUCTS/WORKSTATION/GRAPHICS/FIREPRO-REMOTE-GRAPHICS/R5000/Pages/r5000.aspx, accessed on Jul. 21, 2014, pp. 1-2.

"AMD FirePro™ R5000 Remote Graphics," accessed at http://web.archive.org/web/20131203125539/http://www.amd.com/US/PRODUCTS/WORKSTATION/GRAPHICS/FIREPRO-REMOTE-GRAPHICS/R5000/Pages/r5000.aspx, accessed on Jul. 21, 2014, pp. 1-2.

"Cloud-Based Game Streaming Service Gaikai Raises $30M From Qualcomm, NEA and Others," accessed at http://web.archive.org/web/20131216134410/http://techcrunch.com/2011/07/20/cloud-based-game-streaming-service-gaikai-raises-30m-from-qualcomm-nea-and-others/, accessed on Jul. 21, 2014, pp. 1-3.

"OnLive is changing the way visual computing is delivered," accessed at http://web.archive.org/web/20131211224130/http://www.onlive.com/, accessed on Jul. 21, 2014, pp. 1-2.

Al-Kiswany, S., et al., "GPUs as Storage System Accelerators," IEEE Transactions on parallel and distributed systems, Aug. 2013, pp. 1556-1566, vol. 24, No. 8.

Bhatotia, P., et al., "Shredder: GPU-Accelerated Incremental Storage and Computation," Max Planck Institute for Software Systems (MPI-SWS) and IBM Research—India, 2012, pp. 1-15.

Gallegos, A., "Gaikai Integrated with PlayStation 4," accessed at http://web.archive.org/web/20131209220908/http://www.ign.com/articles/2013/02/20/playstation-cloud-revealed, Feb. 2013, pp. 1-11.

International search report and written opinion for PCT Application No. PCT/US2013/77661 mailed on Jun. 2, 2014, 12 pages.

Meyer, L., "Samsung Launches New Thin- and Zero-Client Displays for Cloud Access through Desktop Virtualization," accessed at http://web.archive.org/web/20130527091634/http:/campustechnology.com/articles/2013/02/13/samsung-launches-new-thin-and-zero-client-displays-for-cloud-access-through-desktop-virtualization.aspx?, Feb. 13, 2013, pp. 1-7.

Phillips, J., "Understanding PCoIP and Zero Clients," accessed at http://web.archive.org/web/20130816074427/http://www.slideshare.net/jstaples29/understanding-pcoip-and-zero-clients, Feb. 24, 2010, pp. 1-8.

Suttisirikul, K. and Uthayopas, P., "Accelerating the Cloud Backup Using GPU Based Data Deduplication," in Proceeding ICPADS '12 Proceedings of the 2012 IEEE 18th International Conference on Parallel and Distributed Systems, 2012, pp. 766-769.

\* cited by examiner

COMPOSITION DATA DISPATCHER

CROSS-REFERENCE TO RELATED APPLICATION

This application is a U.S. National Stage filing under 35 U.S.C. §371 of International Application No. PCT/US13/77661, filed on Dec. 24, 2013, the entirety of which is hereby incorporated by reference.

BACKGROUND

Unless otherwise indicated herein, the materials described in this section are not prior art to the claims in this application and are not admitted to be prior art by inclusion in this section.

A graphics processing unit assigned to a central processing unit may render a frame by manipulating a model based on composition data received from the central processing unit. The central processing unit may send the model and composition data to the graphics processing unit. The graphics processing unit may manipulate the model based on the composition data and render a frame in response.

SUMMARY

In some examples, methods for associating composition data with a graphics processing unit are generally described. The methods may include receiving, by a dispatcher, first composition data that corresponds to a first model. The methods may also include associating, by the dispatcher, the first composition data with a first graphics processing unit. The methods may also include receiving, by the dispatcher, second composition data that corresponds to a second model. The methods may also include determining, by the dispatcher, that the second model is stored in a second graphics processing unit different from the first graphics processing unit. The methods may also include associating, by the dispatcher, the second composition data with the second graphics processing unit based on the determination that the second model is stored in the second graphics processing unit.

In some examples, systems configured to associate composition data with a graphics processing unit are generally described. The systems may include a central processing unit, a first graphics processing unit, a second graphics processing unit, and a dispatcher. The dispatcher may be configured to be in communication with the central processing unit, the first graphics processing unit, and the second graphics processing unit. The dispatcher may be configured to receive first composition data from the central processing unit. The first composition data may correspond to a first model. The dispatcher may also be configured to associate the first composition data with the first graphics processing unit. The dispatcher may also be configured to receive second composition data from the central processing unit. The second composition data may correspond to a second model. The dispatcher may also be configured to determine that the second model is stored in the second graphics processing unit. The dispatcher may also be configured to associate the second composition data with the second graphics processing unit based on the determination that the second model is stored in the second graphics processing unit.

In some examples, composition data dispatchers configured to associate composition data with a graphics processing unit are generally described. The composition data dispatchers may include a processor. The composition data dispatchers may also include a memory. The memory may be configured to be in communication with the processor. The processor may be configured to receive first composition data that corresponds to a first model. The processor may be configured to associate the first composition data with a first graphics processing unit. The processor may be configured to receive second composition data that corresponds to a second model. The processor may be configured to determine that the second model is stored in a second graphics processing unit different from the first graphics processing unit. The processor may be configured to associate the second composition data with the second graphics processing unit based on the determination that the second model is stored in the second graphics processing unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
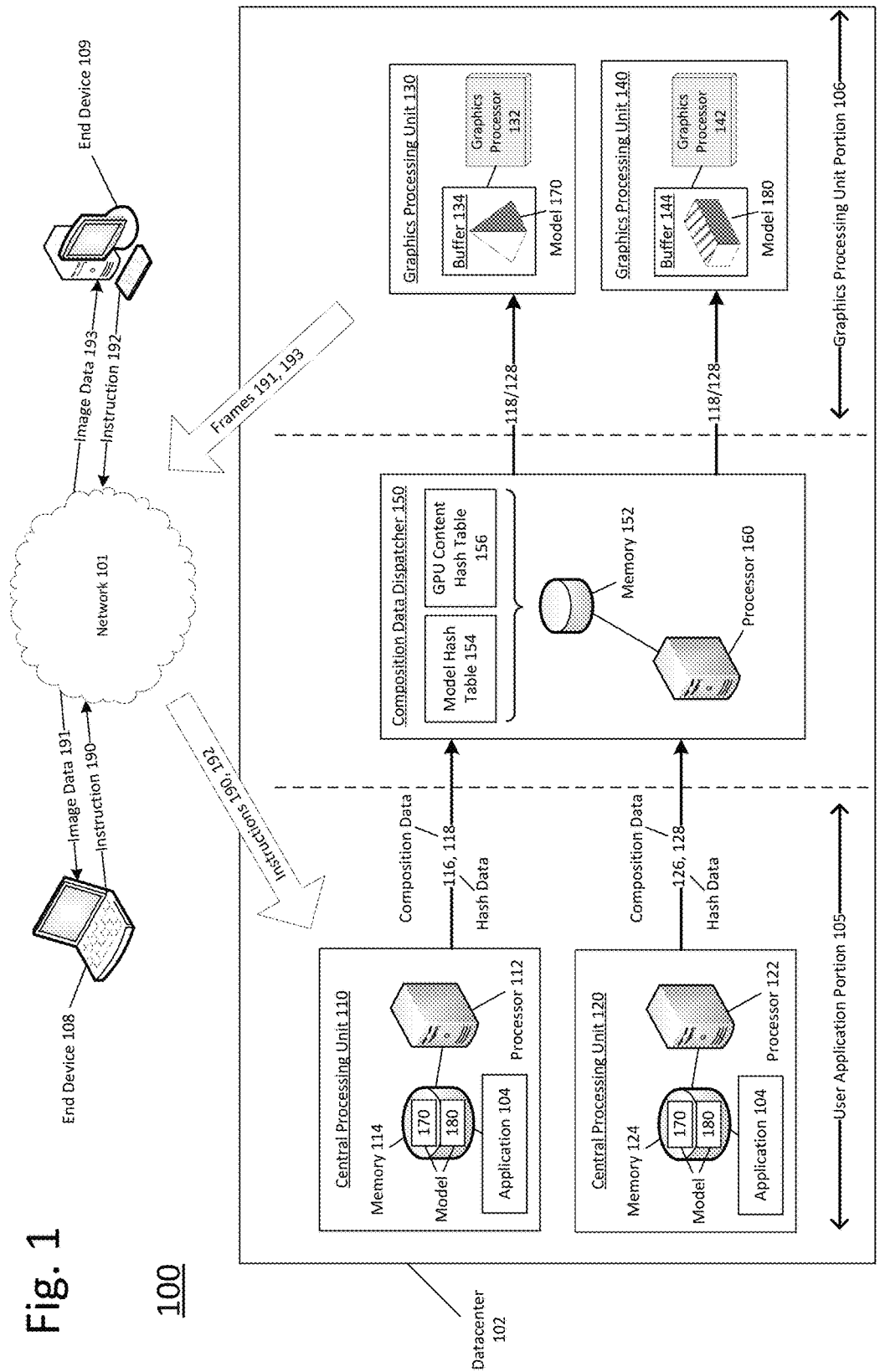
FIG. 1 illustrates an example system that can be utilized to implement a composition data dispatcher.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to association of composition data with one or more graphics processing units using a composition data dispatcher.

Briefly stated, technologies are generally described for methods and systems effective to associate composition data with a graphics processing unit so that a corresponding model may be manipulated and an image produced. Example methods may include receiving, by a dispatcher, first composition data that corresponds to a first model. The methods may also include associating, by the dispatcher, the first composition data with a first graphics processing unit. The methods may also include receiving, by the dispatcher, second composition data that corresponds to a second model. The methods may also include determining, by the dispatcher, that the second model is stored in a second graphics processing unit different from the first graphics processing unit. The methods may also include associating, by the dispatcher, the second composition data with the second graphics processing unit based on the determination that the second model is stored in the second graphics processing unit.

FIG. 1 illustrates an example system that can be utilized to implement a composition data dispatcher, arranged in accordance with at least some embodiments described herein. As depicted, a system 100 may include a data center 102 and one or more end devices 108, 109. Data center 102 may include a user application portion 105, a graphics processing portion 106, and/or a composition data dispatcher 150. User application portion 105 may include one or more central processing units 110, 120. Graphics processing portion 106 may include one or more graphics processing units 130, 140. End devices 108, 109 may be configured to be in communication with central processing units 110, 120 and/or graphics processing units 130, 140 through, for example, a network 101. Network 101 may be a network such as local area network or wide area network, or a system of networks such as the Internet. In some examples, end devices 108, 109 may also be configured to be in communication with central processing units 110, 120 and/or graphics processing units 130, 140 through a router and/or a switch disposed in data center 102. End devices 108, 109 may be devices such as a computer, a laptop, a cellular phone, etc., and may each be configured to display images and/or rendered frames. Composition data dispatcher 150 may be configured to be in communication with central processing units 110, 120 and/or graphics processing units 130, 140. In some examples, central processing units 110, 120 and graphics processing units 130, 140 may be configured to be in communication with each other.

Central processing unit 110 may include a processor 112 and/or a memory 114. Processor 112 may be configured to be in communication with memory 114. Memory 114 may be configured to store an application 104 and/or one or more models 170, 180. Application 104 may be an interactive application such as, by way of example, a video game and/or a presentation application. Models 170, 180 may each be, for example, a two or three-dimensional model that corresponds to, such as may be used by, application 104. For example, if application 104 is a video game, each model 170, 180 may be a character or an item of the video game. One or more graphics processor units, such as graphics processing units 130, 140, may manipulate models 170, 180 based on composition data 118, 128 to produce an image in a frame—as is explained in more detail below.

Processor 112 may be configured to execute application 104 and/or one or more application instances of application 104. During execution of application 104, processor 112 may be configured to receive an instruction 190 or an instruction 192 from end device 108 or end device 109. Instructions 190, 192 may relate to generation of frames 191, 193. In an example, frame 191 may include a particular perspective of model 170 in a particular color. Processor 112 may generate composition data 118 that includes instruction 190 to rotate model 170 to the particular perspective and a color code that represents the particular color. Processor 112 may be configured to analyze information (described in more detail below) provided by composition data dispatcher 150 to determine whether models 170, 180 are stored in at least one graphics processing unit in graphics processing portion 106. Processor 112 may be configured to retrieve models 170, 180 from memory 114 in response to the determination that models 170, 180 are not stored in a graphics processing unit in graphics processing portion 106. However, processor 112 may be configured to generate hash data 116, instead of retrieving models 170, 180, in response to the determination that models 170, 180 are stored in at least one graphics processing unit in graphics processing portion 106. Hash data 116 may include one or more hash of models that correspond to composition data 118. In some examples, hash data 116 may also be one or more identification of one or more models such as an index or name Processor 112 may be configured to send hash data 116 and/or composition data 118 to composition data dispatcher 150.

Central processing unit 120 may include a processor 122 and/or a memory 124. Processor 122 may be configured to be in communication with memory 124. Memory 124 may be configured to store application 104 and/or one or more models 170, 180. Processor 122 may be configured to execute application 104 and/or one or more application instances of application 104. An application instance may be an instantiation of an application. During execution of application 104, processor 122 may be configured to receive instruction 190 or instruction 192 from end device 108 or end device 109. Processor 122 may be configured to generate composition data 128 based on an instruction, such as instruction 190 or instruction 192, received at central processing unit 120. Processor 122 may be configured to analyze information (described in more detail below) provided by composition data dispatcher 150 to determine whether models 170, 180 are stored in at least one graphics processing unit in graphics processing portion 106. Processor 122 may be configured to retrieve models 170, 180 from memory 124 in response to a determination that models 170, 180 are not stored in a graphics processing unit in graphics processing portion 106. Processor 122 may be configured to generate hash data 126 in response to a determination that models 170, 180 are stored in at least one graphics processing unit in graphics processing portion 106. Processor 122 may be configured to generate hash data 126 such as by creating a hash based on model 170 and/or model 180. Processor 122 may be configured to send hash data 126 and/or composition data 128 to composition data dispatcher 150. Composition data 128 may include instructions that correspond to a manipulation of model 170 and/or model 180.

Graphics processing unit 130 may include a graphics processor 132 and/or a buffer 134. Graphics processor 132 may be configured to be in communication with buffer 134. Buffer 134 may be configured to store one or more models. Graphics processor 132 may be configured to render a frame 191 based on instructions in composition data 118, 128 by manipulating one or more models stored in buffer 134 as is described below. Graphics processing unit 130 may be configured to send frame 191 to at least one of end devices 108, 109. Graphics processing unit 140 may include a graphics processor 142 and/or a buffer 144. Graphics processor 142 may be configured to be in communication with buffer 144. Buffer 144 may be configured to store one or more models. Graphics processor 142 may be configured to render a frame 193 based on instructions in composition data 118, 128 by manipulating one or more models stored in buffer 144. Graphics processor 142 may be configured to send frame 193 to at least one of end devices 108, 109.

Composition data dispatcher 150 may include a processor 160 and a memory 152. Processor 160 and memory 152 may be configured to be in communication with each other. Memory 152 may be configured to store a model hash table 154 and a GPU content hash table 156. Model hash table 154 may include hashes in hash data 116, 126 received by composition data dispatcher 150. Processor 160 may be configured to update and/or modify model hash table 154 in response to receiving hash data 116, 126. GPU content hash table 156 may include hashes of models currently stored in buffers 134, 144 of graphics processing units 130, 140. GPU content hash table 156 may also include data indicating specific buffers where models 170, 180 are stored. Processor 160 may be configured to analyze model hash table 154 and GPU content hash table 156 to identify specific buffers where models 170, 180 are stored. Processor 160 may be configured to associate composition data 118, 128 with at least one graphics processing unit 130, 140 based on the determination that respective models are stored in buffers 134, 144. Processor 160 may also be configured to assign one or more models 170, 180 to one or more graphics processing units 130, 140 based on the association.

As described in more detail below, composition data dispatcher 150 may receive hash data 116, 126 and/or composition data 118, 128 from central processing units 110, 120. Composition data dispatcher 150 may update model hash table 154 based on hash data 116, 126. Composition data dispatcher 150 may analyze GPU content hash table 156 based on hash data 116, 126. In response to the analysis, composition data dispatcher 150 may determine whether models 170, 180 are stored in buffers 134, 144. Composition data dispatcher 150 may associate composition data 118, 128 with at least one graphics processing unit among graphics processing units 130, 140 based on the determination that respective models are stored in buffers 134, 144. Composition data dispatcher 150 may thereafter dispatch composition data 118, 128 to an associated graphics processing unit.

Figure 2:
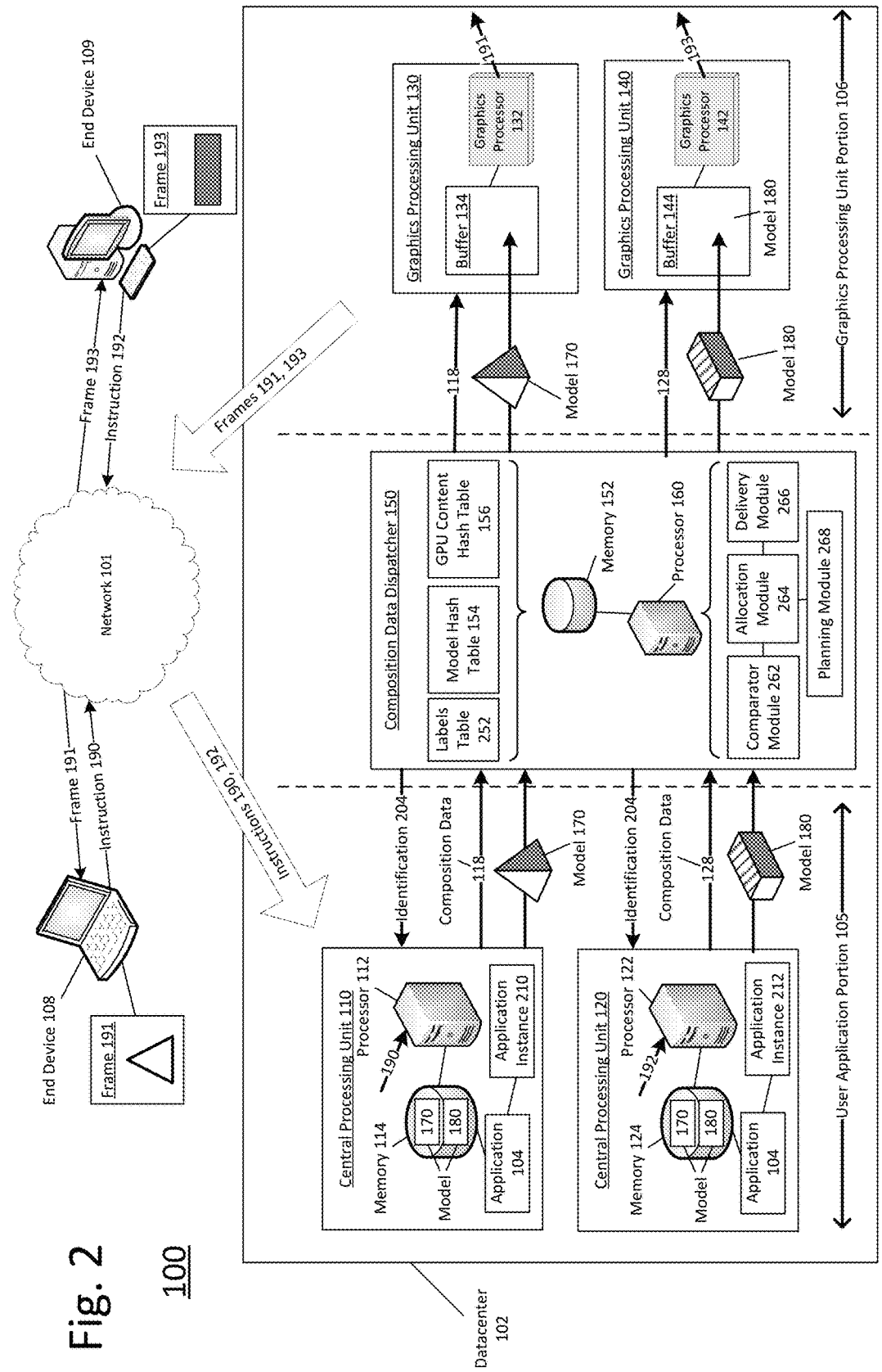
FIG. 2 illustrates the example system of FIG. 1 with additional detail relating to a first frame processed by the composition data dispatcher.

FIG. 2 illustrates example system 100 of FIG. 1 with additional detail relating to a first frame processed by the composition data dispatcher, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Composition data dispatcher 150 may also include a labels table 252, a comparator module 262, an allocation module 264, a delivery module 266, and/or a planning module 268. Processor 160 may also be configured to be in communication with comparator module 262, allocation module 264, delivery module 266, and/or planning module 268. Labels table 252 may be stored in memory 152 and may include identifications, such as names or labels, of models stored in buffers 134, 144. Processor 160 may compile data in labels table 252 to generate an identification 204 that includes names and/or labels of models 170, 180. Processor 160 of composition data dispatcher 150 may be configured to send identification 204 from labels table 252 to central processing units 110, 120 to indicate whether respective models are currently stored in buffers 134, 144. Processor 160 may use comparator module 262 to analyze model hash table 154 and GPU content hash table 156 to identify a model requested by central processing unit 130, 140 and stored in one of graphics processing units 130, 140. Processor 160 may use allocation module 264 to associate composition data 118, 128 with at least one or more graphics processing units. Processor 160 may use delivery module 266 to dispatch composition data 118, 128 to one or more associated graphics processing units. Processor 160 may use planning module 268 to determine one or more available graphics processing units to store models and/or to process composition data.

In an example where system 100 is to process a first frame for one or more application instances of application 104, processor 112 of central processing unit 110 may execute an application instance 210 of application 104 for end device 108. Processor 122 of central processing unit 120 may execute an application instance 212 of application 104 for end device 109. Application instances 210, 212 may correspond to application 104. For example, if application 104 is a video game including multiple maps, application instances 210, 212 may respectively correspond to one of the maps. In some examples, application instances 210, 212 may correspond to a same scene in a video game and may each include respective characters and/or items, where the scene, each character, and/or each item may correspond to a model.

Central processing unit 110 may receive instruction 190 from end device 108 through network 101. Instruction 190 may correspond to generation of frame 191 based on one or more particular properties of model 170 such as orientation, size, texture, contrast, etc. Frame 191 may be a first frame of application instance 210. Processor 112 of central processing unit 110 may analyze instruction 190 and/or identification 204. In response to the analysis of instruction 190, processor 112 may determine that model 170 is required to execute instruction 190.

In an example, prior to receiving instruction 190, central processing unit 110 may receive identification 204 from composition data dispatcher 150. Identification 204 may include an identification of one or more models stored in buffers 134, 144. Processor 112 may determine an absence of an identification of model 170 in identification 204 indicating that model 170 is not stored in buffer 134 or 144. Central processing unit 110 may send model 170 to composition data dispatcher 150 in response to determining the absence of an identification of model 170 in identification 204.

Similarly, central processing unit 120 may receive instruction 192 from end device 109 through network 101. Instruction 192 may correspond to generation of frame 193 based on one or more particular properties of model 180. Frame 193 may correspond to a first frame of application instance 212. Processor 122 of central processing unit 120 may analyze instruction 192 and/or identification 204. In response to the analysis of instruction 192, processor 122 may determine that model 180 is required to execute instruction 192.

In an example, prior to receiving instruction 192, central processing unit 120 may receive identification 204 from composition data dispatcher 150. Processor 122 may determine an absence of an identification of model 180 in identification 204 indicating that model 180 is not stored in buffer 134 or 144. Central processing unit 120 may send model 180 to composition data dispatcher 150 in response to the determination of an absence of an identification of model 180 in identification 204.

In some examples where central processing units 110, 120 are configured to be in communication with graphics processing units 130, 140, central processing units 110, 120 may respectively send models 170, 180 to graphics processing units 130, 140.

Composition data dispatcher 150 may receive composition data 118, 128 and/or models 170, 180 from central processing units 110, 120. Processor 160 of composition data dispatcher 150 may use planning module 268 to assign models to graphics processing units 130, 140. In some examples, processor 160 may use planning module 268 to assign models 170, 180 to graphics processing units 130, 140 based on available storage space in buffers 134, 144. For example, planning module 268 may maintain a database of available data storage space in buffers 134, 144. Processor 160 may assign models to buffers 134, 144 based on available data storage space. In some examples, processor 160 may use planning module 268 to assign models 170, 180 to graphics processing units 130, 140 based on a usage of models 170, 180. For example, planning module 268 may maintain a database to record a frequency of usage of models 170, 180. In an example, if model 170 was used 1000 times in a time period and if model 180 was used 100 times in the same time period, processor 160 may assign model 170 to more than one graphics processing unit.

Composition data dispatcher 150 may send models 170, 180 to graphics processing units 130, 140, respectively, based on the assignment of models 170, 180 by planning module 268. In response to sending models 170, 180 to graphics processing units 130, 140, processor 160 may generate hash data and may update GPU content hash table 156 to indicate models 170, 180 are respectively stored in buffers 134, 144. Processor 160 may also add identification of models 170, 180 to labels table 252. Composition data dispatcher 150 may send an updated identification 204 to central processing units 110, 120. Processor 160 may also send composition data 118, 128 to graphics processing units 130, 140, respectively.

Graphics processing unit 130, 140 may receive models 170, 180 and may store models 170, 180 in buffers 134, 144, respectively. Graphics processing unit 130 may also receive composition data 118. Graphics processor 132 may render frame 191 such as by manipulating model 170 based on composition data 118. For example, composition 118 may include instructions to rotate model 170. Graphics processor 132 may rotate model 170 based on composition data 118 and may render frame 191 after completion of instructions in composition data 118. Similarly, graphics processing unit 140 may receive composition data 128. Graphics processor 142 may render frame 193 such as by manipulating model 180 based on composition data 128. Graphics processing units 130, 140 may respectively send frames 191, 193 to end devices 108, 109 through network 101. End devices 108, 109 may respectively receive frames 191, 193 and may respectively display frames 191, 193.

In examples where application 104 may be a presentation application, application instances 210, 212 may correspond to respective pages of a presentation. For example, model 170 may include a first range of pages in a presentation and model 180 may include a second range of pages in the presentation. Each frame rendered from models 170, 180 by a graphics processing unit may be a particular page in the corresponding range of pages.

Figure 3:
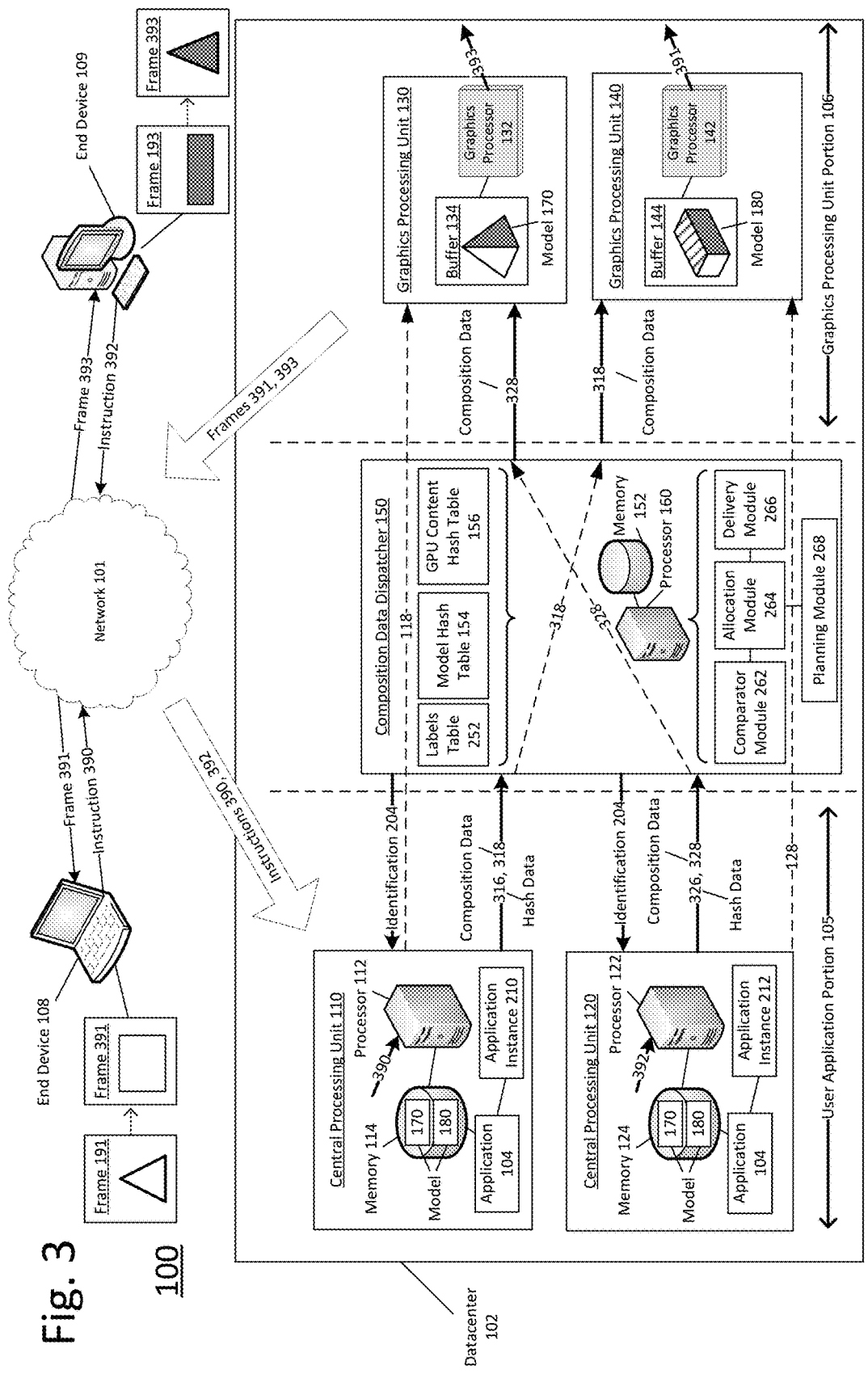
FIG. 3 illustrates the example system of FIG. 1 with additional detail relating to a second or subsequent frames processed by the composition data dispatcher.

FIG. 3 illustrates example system 100 of FIG. 1 with additional detail relating to a second or subsequent frames processed by the composition data dispatcher, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

As explained in more detail below, in the example shown in FIG. 3, processor 160 may send composition data from a central processing unit to different graphics processing units based on storage of associated models. In an example, system 100 may process a second frame for one or more application instances of application 104. Buffers 134, 144 may include models 170, 180, respectively. Identification 204 may include identification of models 170, 180. Central processing unit 110 may receive an instruction 390 from end device 108 through network 101. Instruction 390 may correspond to generation of a frame 391 based on one or more particular properties of model 180. Frame 391 may be a second frame of application instance 210 subsequent to frame 191. Processor 112 may determine that model 180 is required to execute instruction 390.

In an example, prior to receiving instruction 390, central processing unit 110 may receive identification 204 from composition data dispatcher 150. Processor 112 may determine a presence of an identification of model 180 in identification 204 indicating that model 180 is stored in at least one of buffers 134, 144. Processor 112 may generate hash data 316 for model 180 in response to the determination of the presence of an identification of model 180 in identification 204. Hash data 316 may include a hash that corresponds to model 180. Processor 112 may generate composition data 318 based on instruction 390. Instead of sending model 180, central processing unit 110 may send composition data 318 and hash data 316 to composition data dispatcher 150.

Similarly, central processing unit 120 may receive an instruction 392 from end device 109 through network 101. Instruction 392 may correspond to generation of a frame 393 based on one or more particular properties of model 170. Frame 393 may be a second frame of application instance 212 subsequent to frame 193 of application instance 212. Processor 122 may determine that model 170 is required to execute instruction 392.

In an example, prior to receiving instruction 392, central processing unit 120 may receive identification 204 from composition data dispatcher 150. Processor 122 may determine a presence of an identification of model 170 in identification 204 indicating that model 170 is stored in at least one of buffers 134, 144. Processor 122 may generate hash data 326 for model 170 in response to the determination of the presence of an identification of model 170 in identification 204. Hash data 326 may include a hash that corresponds to model 170. Processor 122 may generate composition data 328 based on instruction 392. Instead of sending model 170, central processing unit 120 may send hash data 326 and composition data 328 to composition dispatcher 150.

In an example, central processing units 110, 120 may not receive identification 204 from composition data dispatcher 150. Processor 112 may send composition data 318 and model 180 to composition data dispatcher 150. Processor 122 may send composition data 328 and model 170 to composition data dispatcher 150. Composition data dispatcher 150 may receive composition data 318, 328 and models 170, 180. Composition data dispatcher 150 may generate hash data 316, 326 in response to receiving models 170, 180.

Composition data dispatcher 150 may receive composition data 318, 328 from central processing units 110, 120. Composition data dispatcher 150 may also receive hash data 316, 326 from central processing units 110, 120. Processor 160 of composition data dispatcher 150 may store hash data 316, 326 in model hash table 254. Processor 160 may analyze data in GPU content hash table 256, based on hash data 316, 326 and associate composition data 318, 328 with graphics processing units 130, 140 based on the analysis. For example, processor 160 may use comparator module 252 to compare data in model hash table 154 with data in GPU content hash table 156. Based on the comparison, processor 160 may determine model 170 may be stored in buffer 134 of graphics processing unit 130 and model 180 may be stored in buffer 144 of graphics processing unit 140. Processor 160 may use allocation module 264 to associate graphics processing unit 130 with composition data 328 from central processing unit 120 based on storage of model 170 in buffer 134. Processor 160 may associate graphics processing unit 130 with composition data 328 from central processing unit 120 even though composition data 128 from central processing unit 120 for frame 193 was associated with graphics processing unit 140.

Processor 160 may use allocation module 264 to associate graphics processing unit 140 with composition data 318 from central processing unit 110 based on storage of model 180 in buffer 144. Processor 160 may associate graphics processing unit 140 with composition data 318 from central processing unit 110 even though composition data 118 from central processing unit 110 for frame 191 was associated with graphics processing unit 130. Processor 160 may use delivery module 266 to respectively dispatch composition data 328, 318 to graphics processing units 130, 140 based on the associations.

Graphics processing unit 130 may receive composition data 328. Graphics processor 132 may render frame 393 such as by manipulating model 170 based on composition data 328. Graphics processing unit 140 may receive composition data 318. Graphics processor 142 may render frame 391 such as by manipulating model 180 based on composition data 318. Graphics processing unit 130 may send frame 393 to end device 109 through network 101. End device 109 may receive frame 393 and may display frame 393. Graphics processing unit 140 may send frame 391 to end device 108 through network 101. End device 108 may receive frame 391 and may display frame 391.

Figure 4:
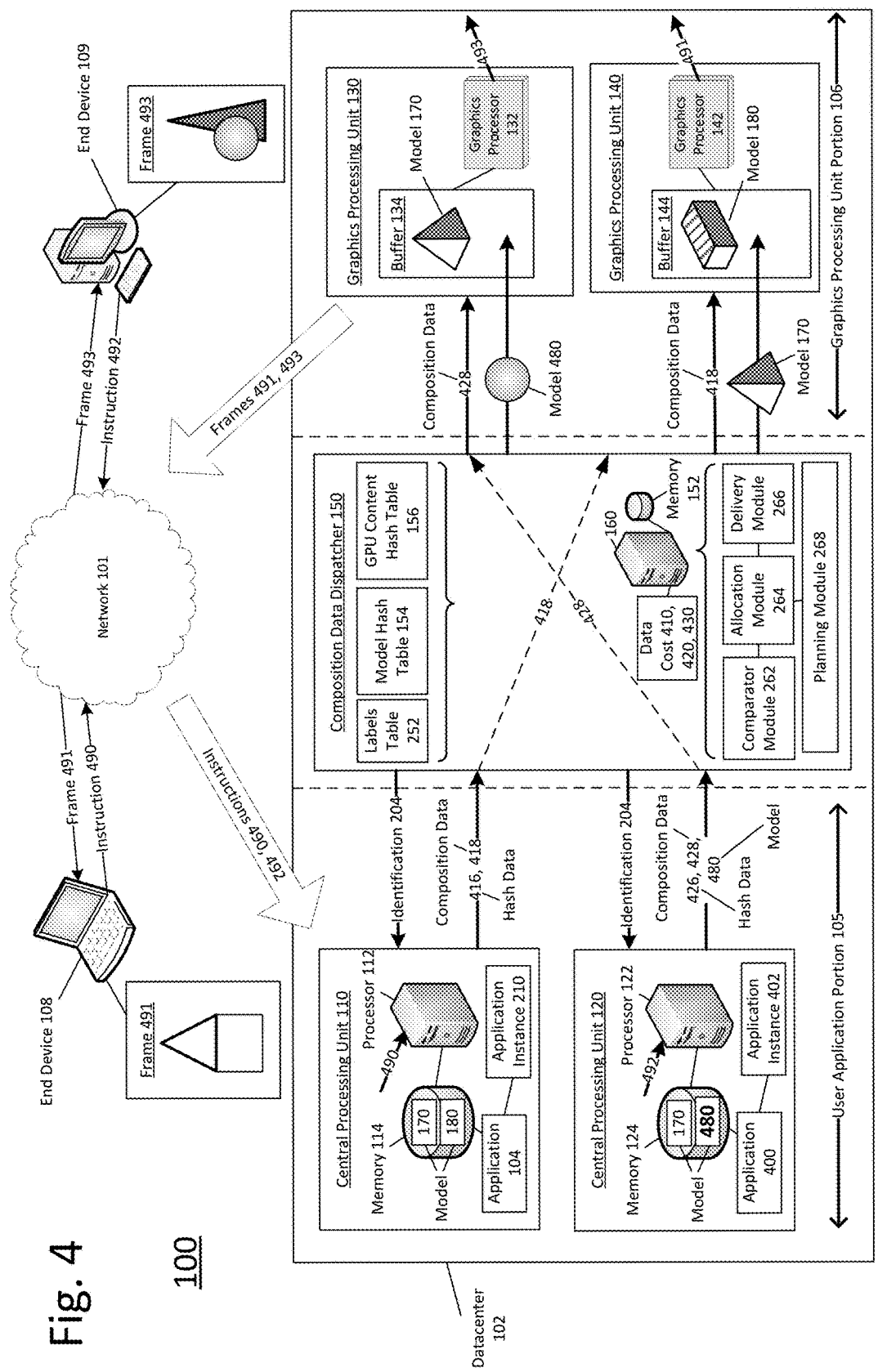
FIG. 4 illustrates the example system of FIG. 1 with additional detail relating to data costs stored in connection with models.

FIG. 4 illustrates the example system of FIG. 1 with additional detail relating to data costs stored in connection with models, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity.

In some examples, association of composition data with at least one graphics processing unit may be based on a data cost (explained in more detail below). Briefly, data cost may correspond to an amount of data transmitted during transmission of composition data and/or a model from composition data dispatcher 150 to a particular graphics processing unit. Data cost may be based on a size of one or more models being transmitted or the data cost may be based on models currently stored in a buffer.

In an example, system 100 is to process a frame for application instance 210 of application 104 and application instance 402 for an application 400. Buffers 134, 144 may include models 170, 180, respectively. Central processing unit 110 may execute application instance 210 of application 104 for end device 108. Central processing unit 120 may execute application instance 402 of application 400 for end device 109. Memory 124 may store an application 400 and/or a model 480 that corresponds to application 400. Model 480 may be a three-dimensional model that corresponds to application 400.

Composition data dispatcher 150 may send identification 204 from labels table 252 to central processing units 110, 120. Identification 204 may include identifications of models 170, 180 stored in labels table 252 and thus stored in graphics processing units 130, 140. Central processing unit 110 may receive instructions 490 from end device 108 through network 101 during execution of application instance 210. Instruction 490 may correspond to generation of frame 491 based on one or more particular properties of models 170, 180. Central processing unit 120 may receive instructions 492 from end device 109 through network 101 during execution of application instance 402. Instruction 492 may correspond to generation of frame 493 based on one or more particular properties of models 170, 480.

Processor 112 of central processing unit 110 may analyze instruction 490 and/or identification 204. Processor 112 may determine that models 170, 180 are required to execute instruction 490. Processor 112 may determine a presence of an identification of models 170, 180 in identification 204. Processor 112 may generate hash data 416 that corresponds to models 170 and 180. Processor 112 may generate composition data 418 that corresponds to model 170 and model 180, based on instruction 490. Central processing unit 110 may send hash data 416 and/or composition data 418 to composition data dispatcher 150.

Processor 122 of central processing unit 120 may analyze instruction 492 and/or identification 204. Processor 122 may determine that model 170 and model 480 are required to execute instruction 492. Processor 122 may determine a presence of an identification of model 170 and an absence of identification of model 480 in identification 204. This determination may mean that model 170 need not be sent to composition data dispatcher 150 and that model 480 should be sent to composition data dispatcher 150. Processor 122 may generate hash data 426 based on the determination of the presence of an identification of model 170 in identification 204. Hash data 426 may include a hash that corresponds to model 170. Processor 122 may generate composition data 428 based on instruction 492. Central processing unit 120 may send hash data 426 and/or composition data 428 to composition data dispatcher 150. Processor 122 may also send model 480 to composition data dispatcher 150 in response to the absence of an identification of model 480 in identification 204.

Composition data dispatcher 150 may receive hash data 416 and/or composition data 418 from central processing unit 110. Composition data dispatcher 150 may also receive model 480, hash data 426 and/or composition data 428 from central processing unit 120. In an example, central processing units 110, 120 may not receive identification 204 from composition data dispatcher 150. Processors 112 may send composition data 418 and models 170, 180 to composition data dispatcher 150. Processor 122 may send composition data 428 and models 170, 480 to composition data dispatcher 150. Composition data dispatcher 150 may receive composition data 418, 428 and models 170, 180, 480. Composition data dispatcher 150 may generate hash data 416, 426 that correspond to models 170, 180, 480.

Processor 160 of composition data dispatcher 150 may store hash data 416, 426 in model hash table 254. Processor 160 may analyze data in GPU content hash table 156 and may determine model 170 is stored in buffer 134 of graphics processing unit 130 and model 180 is stored in buffer 144 of graphics processing unit 140.

Planning module 268 may include instructions for allocation module 264 to associate at least one of graphics processing units 130, 140 with composition data 418, 428 based on data costs 410, 420, 430. Data costs 410, 420, 430 may be determined by processor 160 based on instructions in planning module 268. Planning module 268 or GPU content hash table 156 may maintain a database that includes information corresponding to a size of models 170, 180, 480 stored in buffers 134, 144. Processor 160 may associate composition data with respective graphics processing units based on a size of models stored in the respective graphics processing unit. For example, if a relatively larger model is stored in a particular graphics processing unit, then processor 160 may associate composition data corresponding to the larger model with the particular graphics processing unit. This association helps avoid sending the relatively large model from composition data dispatcher 150 to the respective graphics processing unit.

Processor 160 may determine data cost 410 where data cost 410 corresponds to an amount of data needed to transmit model 170 to a graphics processing unit. Processor 160 may determine data cost 420 where data cost 420 corresponds to an amount of data needed to transmit model 180 to a graphics processing unit. Processor 160 may determine data cost 430 where data cost 430 corresponds to an amount of data needed to transmit model 480 to a graphics processing unit.

Processor 160 may evaluate data costs 410, 420, 430. Processor 160 may determine data cost 420 is larger than data costs 410, 430. In an example, planning module 268 may include instructions to minimize a total data cost during operations of composition data dispatcher 150. Processor 160 may first identify the largest data cost—in the example model 180 has the largest data cost 420. As model 180 has the largest data cost, processor 160 may avoid moving sending model 180 into and out of buffers. Processor 160 may determine that model 180 is stored in buffer 144. Processor 160 may analyze composition data 418, 428 and may determine that composition data 418 requires model 180. Processor 160 may use allocation module 264 to associate composition data 418 with graphics processing unit 140 to avoid sending model 180 to buffers. Processor 160 may send composition data 418 and model 170 to graphics processing unit 140 based on the association. Processor 160 may send model 170 to graphics processing unit 140 because model 170 has a lower data cost than model 180.

Graphics processing unit 130 may receive composition data 428 and model 480. Graphics processing unit 130 may store model 480 in buffer 134. Graphics processor 132 may render frame 493 such as by manipulating and/or combining models 170, 480 based on composition data 428. Graphics processing unit 140 may receive composition data 418 and model 170. Graphics processing unit 140 may store model 170 in buffer 144. Graphics processor 142 may render frame 491 such as by manipulating and/or combining models 170, 180 based on composition data 428. Graphics processing unit 130 may send frames 493 to end device 109 through network 101. End device 109 may receive frames 493 and may display frames 493. Graphics processing unit 140 may send frames 491 to end device 108 through network 101. End device 108 may receive frames 491 and may display frames 491.

In some examples, association of composition data 418, 428 may be based on a number of required models stored in each buffer. For example, when composition data 418 requires five different models and four of the five models are stored in buffer 134, composition data dispatcher 150 may associate composition data 418 with graphics processing unit 130 even if the fifth model is stored in buffer 144.

In some examples, association of composition data 418, 428 may be based on a total data cost of models stored in each buffer. In the example, composition data 418 may require five different models and four of the five models are stored in buffer 134 of graphics processing unit 130. The fifth model may be stored in buffer 144 and have a data cost larger than a sum of the data cost of the other four models. In this example, composition data dispatcher 150 may associate composition data 418 with graphics processing unit 140 and may send the other models to buffers.

In some examples, planning module 268 may retain historical data that corresponds to association of composition data 418, 428 with respective graphics processing units. Processor 160 may associate composition data based on the historical data. In examples where buffers 134, 144 may be full, processor 160 may analyze the historical data to select one or more models and may remove one or more models based on the historical data. For example, processor 160 may remove a model used less often than other models as may be indicated by the historical data. In another example, processor 160 may remove a model based on its availability in other buffer(s).

In the example depicted in FIG. 4, when buffers 134, 144 are full and models 170, 480 are used more often than model 180, processor 160 may instruct graphics processing unit 140 to remove model 180 from buffer 144. In some examples, planning module 268 may maintain historical data of combinations of models. For example, if composition data 118, 128 requires a combination of models 170, 180, a threshold number of times, planning module 268 may include instructions for processor 160 to avoid removal of model 170 from a buffer that includes model 180 and vice versa.

Among other possible benefits, a system in accordance with the disclosure may benefit service providers that utilize datacenter rendering and users of services by the service providers. A system in accordance with the disclosure may provide a significant graphics processing speed improvement by minimizing a need to send models from central processing units to graphics processing units in a datacenter. A system in accordance with the disclosure may improve power usage by reducing and/or minimizing a need to send models from central processing units to graphics processing units in a datacenter. A system may also reduce the number of required graphics processing units in a datacenter by reusing stored models. The improvement in graphics processing speed may also benefit users of such services as users may view a desired frame sooner based on the improved processing speed.

A system in accordance with the disclosure may also benefit companies that may be supporting a large number of employees with few datacenters. For example, when a number of employees are viewing a particular page of a presentation, one employee may select the next page. The graphics processing unit handling the particular page may continue to process the particular page without receiving a new model that corresponds to the next page or range of pages. The composition data dispatcher may associate the model that corresponds to the next page or range of pages to another graphics processing unit, which already includes the model that corresponds to the next page or range of pages.

Figure 5A:
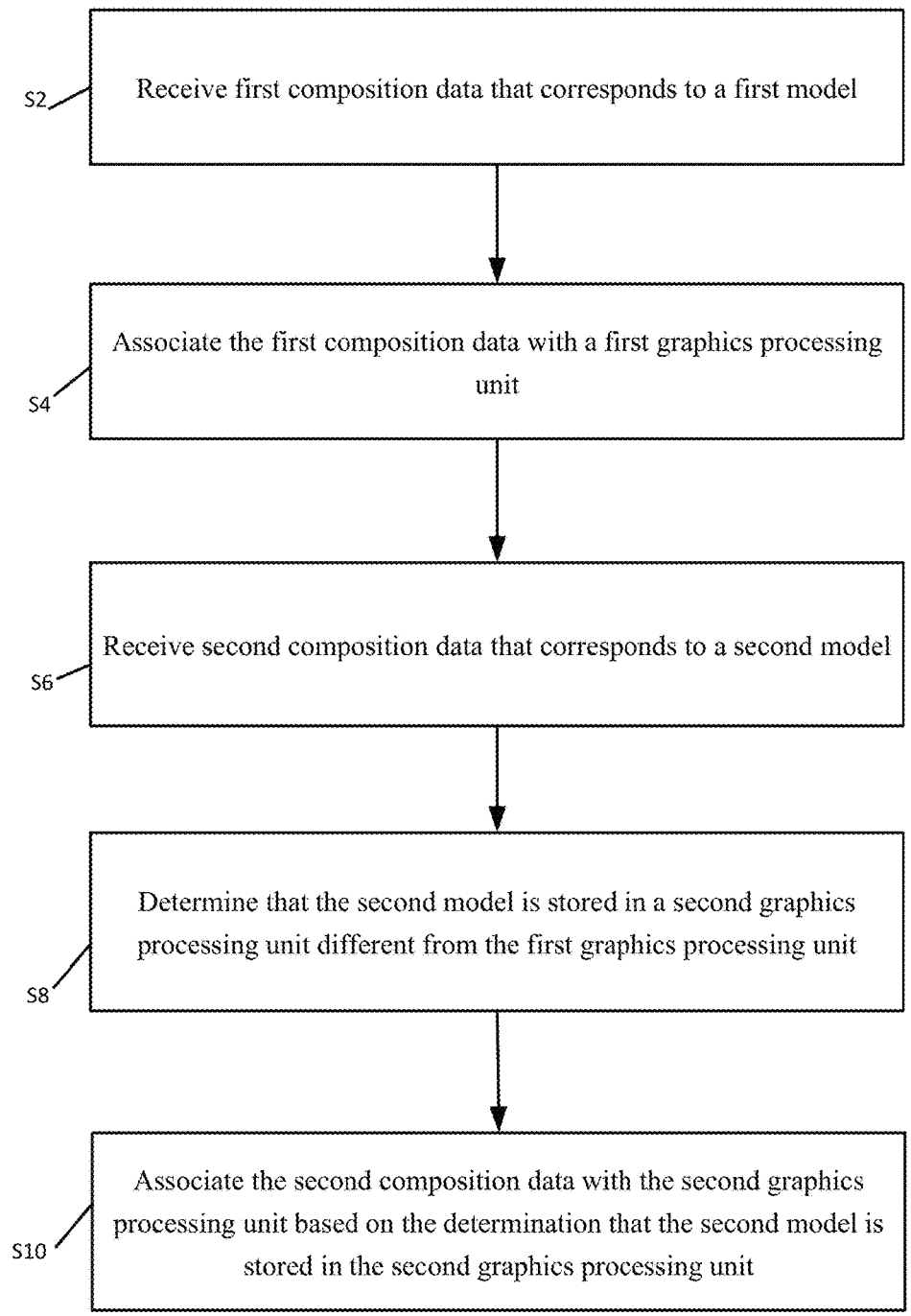
FIG. 5A illustrates a flow diagram for an example process for implementing a composition data dispatcher.

FIG. 5A illustrates a flow diagram for an example process for implementing a composition data dispatcher, arranged in accordance with at least some embodiments presented herein. The process in FIG. 5A could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Receive first composition data that corresponds to a first model." A dispatcher, such as a composition data dispatcher, may receive first composition data. The first composition data may correspond to a first model. Prior to receipt of the first composition data, a processing unit, such as a central processing unit, may receive an identification from the dispatcher. The identification may correspond to the first model. The processing unit may generate hash data. The hash data may correspond to the first model. The processing unit may send the hash data and/or the first composition data to the dispatcher. The dispatcher may receive the hash data. The dispatcher may analyze a hash table.

Processing may continue from block S2 to block S4, "Associate the first composition data with a first graphics processing unit." The dispatcher may associate the first composition data with a first graphics processing unit. The association of the first composition data with the first graphics processing unit may be based on the hash data and/or the analysis of the hash table by the dispatcher.

Processing may continue from block S4 to block S6, "Receive second composition data that corresponds to a second model." The dispatcher may receive second composition data. The second composition data may correspond to a second model.

Processing may continue from block S6 to block S8, "Determine that the second model is stored in a second graphics processing unit different from the first graphics processing unit." The dispatcher may determine that the second model is stored in a second graphics processing unit. The second graphics processing unit may be different from the first graphics processing unit.

Processing may continue from block S8 to block S10, "Associate the second composition data with the second graphics processing unit based on the determination that the second model is stored in the second graphics processing unit." The dispatcher may associate the second composition data with the second graphics processing unit. The association of the second composition data with the second graphics processing unit may be based on the determination that the second model is stored in the second graphics processing unit.

The first graphics processing unit may render a first frame based on the first composition data. The first graphics processing unit may send the first frame to a first end device. The second graphics processing unit may render a second frame based on the second composition data. The second graphics processing unit may send the second frame to a second end device. In some examples, the first model may correspond to a first range of pages of a visual presentation. The first frame may correspond to a first page within the first range of pages. The second model may correspond to a second range of pages of a visual presentation. The second frame may correspond to a second page within the second range of pages.

The dispatcher may also receive third composition data. The third composition data may correspond to a combination of the first model and the second model. The dispatcher may determine a first data cost. The first data cost may correspond to a transmission of the first model to the second graphics processing unit. The dispatcher may determine a second data cost. The second data cost may correspond to a transmission of the second model to the first graphics processing unit. The dispatcher may determine the second data cost is larger than the first data cost. The dispatcher may associate the third composition data with the second graphics processing unit based on the determination that the second data cost is larger than the first data cost and based on the determination that the second model is stored in the second graphics processing unit. The dispatcher may also send the first model to the second graphics processing unit.

The dispatcher may determine a first frequency. The first frequency may correspond to usage of the first model. The dispatcher may determine a second frequency. The second frequency may correspond to usage of the second model. The dispatcher may determine that the first frequency is larger in value than the second frequency. The dispatcher may store the first model in the second graphics processor based on the determination that the first frequency is larger than the second frequency.

Figure 5B:
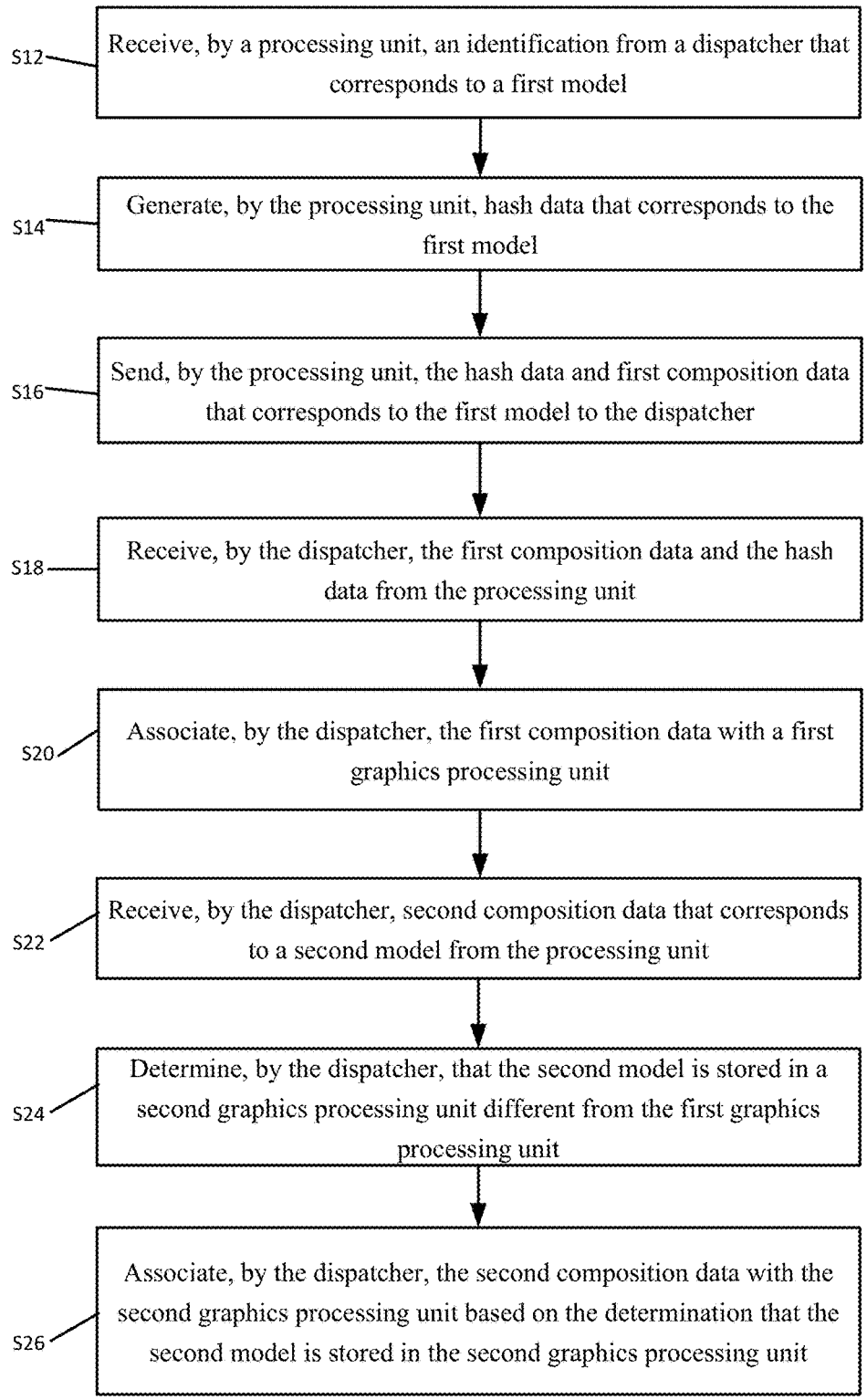
FIG. 5B illustrates a flow diagram for an example process for implementing a composition data dispatcher.

FIG. 5B illustrates a flow diagram for an example process for implementing a composition data dispatcher, arranged in accordance with at least some embodiments presented herein. The process in FIG. 5B could be implemented using, for example, system 100 discussed above. An example process may include one or more operations, actions, or functions as illustrated by one or more of blocks S12, S14, S16, S18, S20, S22, S24 and/or S26. Although illustrated as discrete blocks, various blocks may be divided into additional blocks, combined into fewer blocks, or eliminated, depending on the desired implementation.

Processing may begin at block S12, "Receive, by a processing unit, an identification from a dispatcher that corresponds to a first model." A processing unit, such as a central processing unit, may receive an identification from a dispatcher. The identification may correspond to the first model.

Processing may continue from block S12 to S14, "Generate, by the processing unit, hash data that corresponds to the first model." The processing unit may generate hash data. The hash data may correspond to the first model.

Processing may continue from block S14 to S16, "Send, by the processing unit, the hash data and first composition data that corresponds to the first model to the dispatcher." The processing unit may send the hash data and/or the first composition data to the dispatcher.

Processing may continue from block S16 to S18, "Receive, by the dispatcher, the first composition data and the hash data from the processing unit." The dispatcher may receive first composition data and hash data from the processing unit. The dispatcher may also receive the hash data. The dispatcher may analyze a hash table.

Processing may continue from block S18 to block S20, "Associate, by the dispatcher, the first composition data with a first graphics processing unit." The dispatcher may associate the first composition data with a first graphics processing unit. The association of the first composition data with the first graphics processing unit may be based on the hash data and/or the analysis of the hash table by the dispatcher.

Processing may continue from block S20 to block S22, "Receive, by the dispatcher, second composition data that corresponds to a second model from the processing unit." The dispatcher may receive second composition data from the processing unit. The second composition data may correspond to a second model.

Processing may continue from block S22 to block S24, "Determine, by the dispatcher, that the second model is stored in a second graphics processing unit different from the first graphics processing unit." The dispatcher may determine that the second model is stored in a second graphics processing unit. The second graphics processing unit may be different from the first graphics processing unit.

Processing may continue from block S24 to block S26, "Associate, by the dispatcher, the second composition data with the second graphics processing unit based on the determination that the second model is stored in the second graphics processing unit." The dispatcher may associate the second composition data with the second graphics processing unit. The association of the second composition data with the second graphics processing unit may be based on the determination that the second model is stored in the second graphics processing unit.

Figure 6:
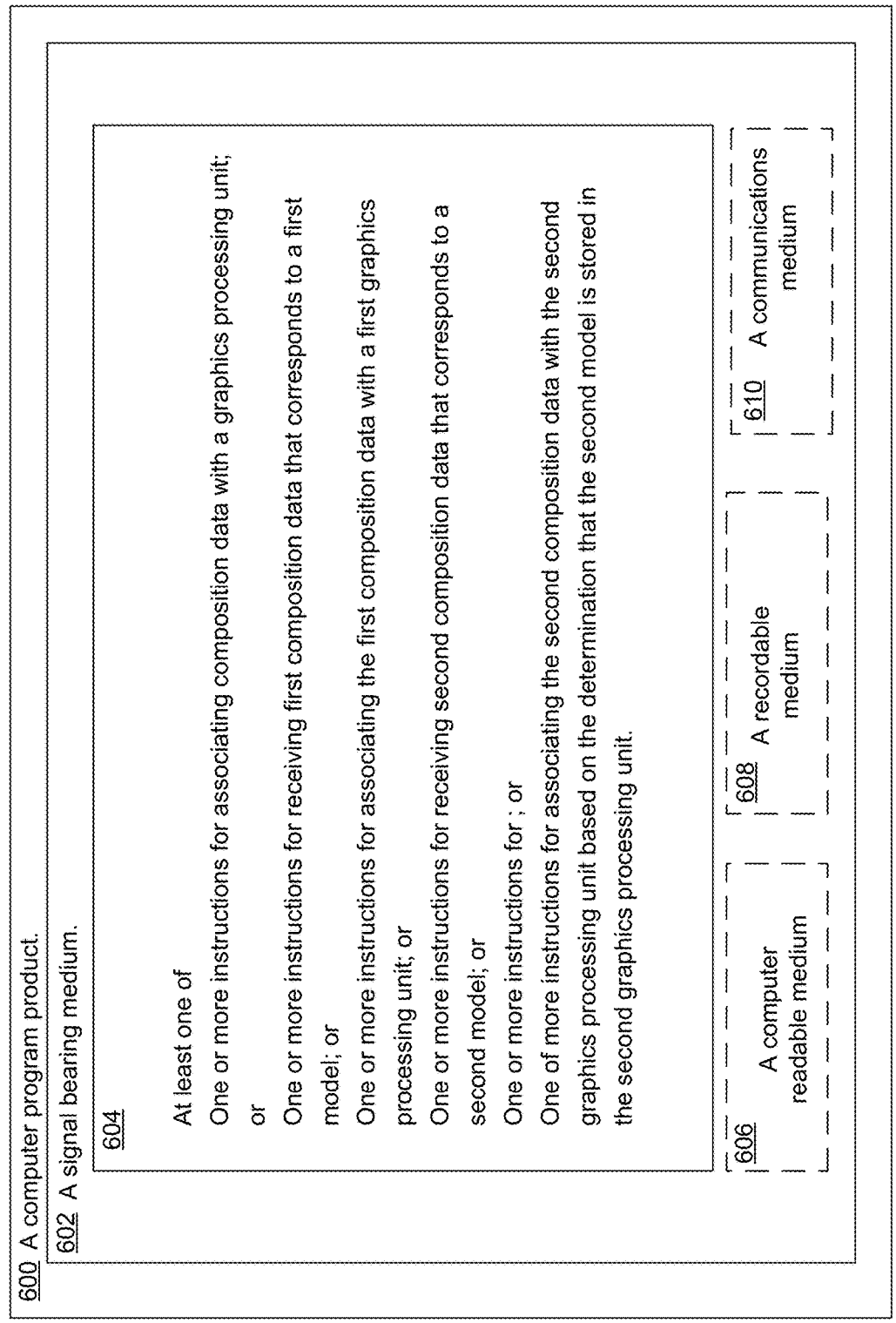
FIG. 6 illustrates an example computer program product that can be utilized to implement a composition data dispatcher.

FIG. 6 illustrates an example computer program product 600 that can be utilized to implement a composition data dispatcher, arranged in accordance with at least some embodiments described herein. Computer program product 600 may include a signal bearing medium 602. Signal bearing medium 602 may include one or more instructions 604 that, when executed by, for example, a processor, may provide the functionality described above with respect to FIGS. 1-5B. Thus, for example, referring to system 100, processor 160 may undertake one or more of the blocks shown in FIGS. 5A, 5B in response to instructions 604 conveyed to the system 100 by signal bearing medium 602.

In some implementations, signal bearing medium 602 may encompass a computer-readable medium 606, such as, but not limited to, a hard disk drive (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, computer program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

Figure 7:
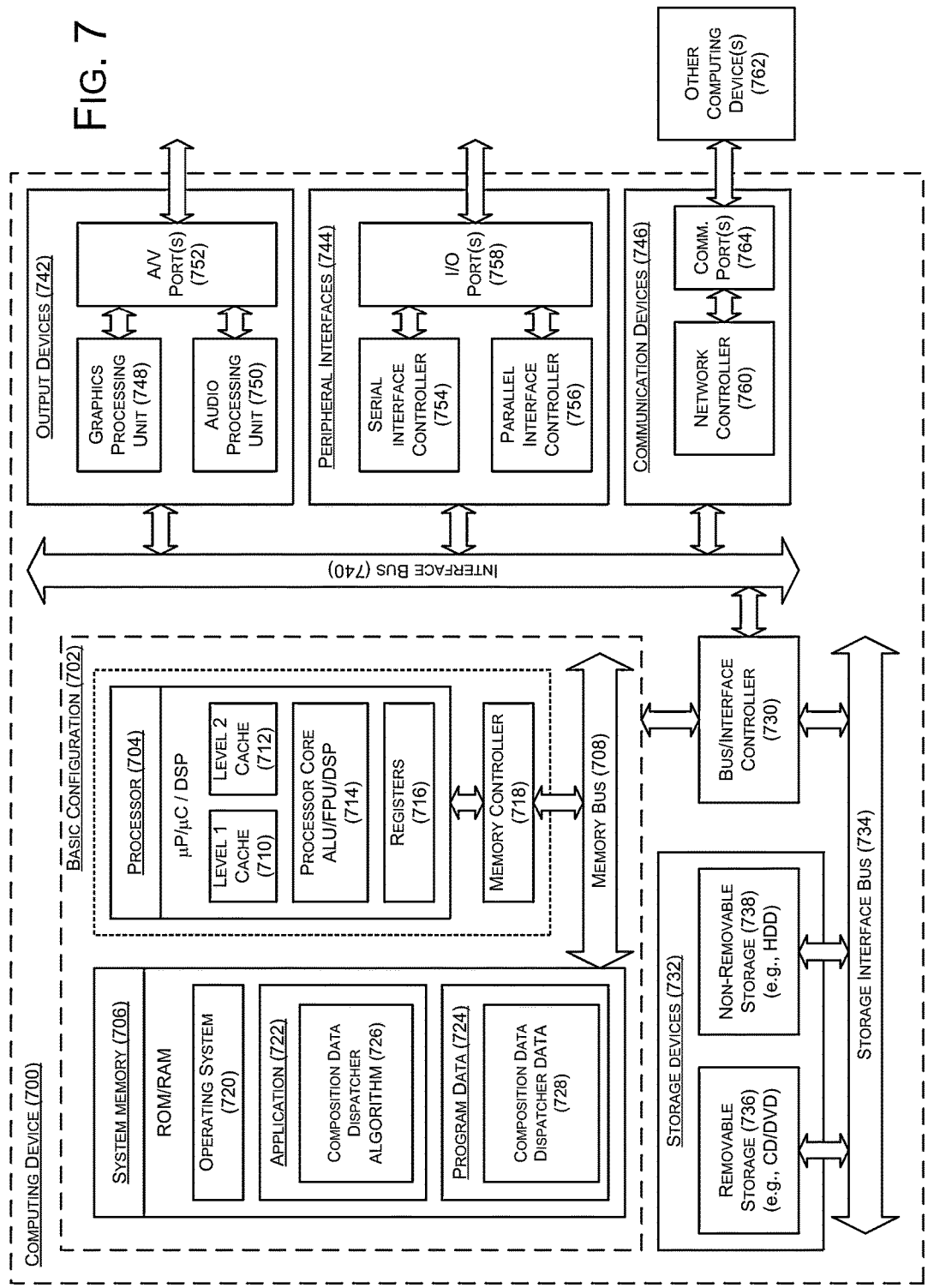
FIG. 7 is a block diagram illustrating an example computing device that may be arranged to implement a composition data dispatcher, all arranged according to at least some embodiments described herein.

FIG. 7 is a block diagram illustrating an example computing device 700 that may be arranged to implement a composition data dispatcher, arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor ($\mu P$), a microcontroller ($\mu C$), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with processor 704, or in some implementations, memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a composition data dispatcher algorithm 726 that is arranged to perform the functions as described herein including those described with respect to system 100 of FIGS. 1-5B. Program data 724 may include composition data dispatcher data 728 that may be useful for implementation of a composition data dispatcher as is described herein. In some embodiments, application 722 may be arranged to operate with program data 724 on operating system 720 such that implementations of composition data dispatcher may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to associate composition data with a graphics processor unit, the method comprising, by a dispatcher:
    receiving first composition data from a first processor unit, wherein the first composition data corresponds to a first model, and wherein the first composition data is generated based on one or more instructions received from one or more end devices;
    associating the first composition data with a first graphics processor unit;
    receiving second composition data from a second processor unit, wherein the second composition data corresponds to a second model, and wherein the second composition data is generated based on the one or more instructions received from the one or more end devices;
    associating the second composition data with a second graphics processor unit that is different from the first graphics processor unit;
    receiving third composition data from the first processor unit, wherein the third composition data corresponds to the second model, and wherein the third composition data is generated based on the one or more instructions received from the one or more end devices;
    determining that the second model is stored in the second graphics processor unit; and
    associating the third composition data with the second graphics processor unit based on the determination that the second model is stored in the second graphics processor unit.

2. The method of claim 1, wherein prior to sending the first composition data, the first processor unit:
    receives an identification from the dispatcher, wherein the identification corresponds to the first model;
    determines whether the first model is stored in the first graphics processor unit or not; and
    in response to a determination that the first model is stored in the first graphics processor unit:
        generates hash data that corresponds to the first model, and
        sends the hash data and the first composition data to the dispatcher.

3. The method of claim 2, further comprising, by the dispatcher:
    receiving the hash data;
    updating a hash table in response to the received hash data; and
    analyzing the hash table,
    wherein associating the first composition data with the first graphics processor unit is based on the received hash data and the analysis of the hash table.

4. The method of claim 1, wherein prior to sending the first composition data, the first processor unit:
    receives an identification from the dispatcher, wherein the identification corresponds to the first model;
    determines whether the first model is stored in the first graphics processor unit or not; and
    in response to a determination that the first model is not stored in the first graphics processor unit, sends the first model and the first composition data to the dispatcher.

5. The method of claim 4, further comprising, by the dispatcher:
    receiving the first model;
    sending the first model to the first graphics processor unit;
    generating hash data that corresponds to the first model; and
    storing the hash data in a memory of the dispatcher.

6. The method of claim 1, wherein:
    the first graphics processor unit renders a first frame based on the first composition data and the first model,
    the first graphics processor unit sends the first frame to a first end device of the one or more end devices,
    the second graphics processor unit renders a second frame based on the second composition data and the second model, and
    the second graphics processor unit sends the second frame to a second end device, different from the first end device, of the one or more end devices.

7. A method to associate composition data with a graphics processor unit, the method comprising, by a dispatcher:
    receiving first composition data from a first processor unit, wherein the first composition data corresponds to a first model;
    associating the first composition data with a first graphics processor unit;
    receiving second composition data from a second processor unit;
    associating the second composition data with a second graphics processor unit that is different from the first graphics processor unit,
    wherein the first graphics processor unit renders a first frame based on the first composition data and the first model;
    sending the first frame to a first end device,
    wherein the second graphics processor unit renders a second frame based on the second composition data and a second model; and
    sending the second frame to a second end device that is different from the first end device, wherein:
        the first model corresponds to a first range of pages of a visual presentation,
        the first frame corresponds to a first page within the first range of pages,
        the second model corresponds to a second range of pages of the visual presentation, and
        the second frame corresponds to a second page within the second range of pages.

8. A method to associate composition data with a graphics processor unit, the method comprising, by a dispatcher:
    receiving first composition data from a first processor unit, wherein the first composition data corresponds to a first model;
    associating the first composition data with a first graphics processor unit;
    receiving second composition data from a second processor unit, wherein the second composition data corresponds to a second model;
    associating the second composition data with a second graphics processor unit that is different from the first graphics processor unit;
    receiving third composition data from the first processor unit, wherein the third composition data corresponds to the second model;

determining that the second model is stored in the second graphics processor unit;
associating the third composition data with the second graphics processor unit based on the determination that the second model is stored in the second graphics processor unit;
receiving fourth composition data that corresponds to a combination of the first model and the second model;
determining a first data cost that corresponds to transmission of the first model to the second graphics processor unit;
determining a second data cost that corresponds to transmission of the second model to the first graphics processor unit;
determining that the second data cost is larger than the first data cost; and
associating the fourth composition data with the second graphics processor unit based on the determination that the second data cost is larger than the first data cost and based on the determination that the second model is stored in the second graphics processor unit.

9. The method of claim 8, further comprising sending the first model to the second graphics processor unit.

10. A method to associate composition data with a graphics processor unit, the method comprising, by a dispatcher:
receiving first composition data from a first processor unit, wherein the first composition data corresponds to a first model;
associating the first composition data with a first graphics processor unit;
receiving second composition data from a second processor unit, wherein the second composition data corresponds to a second model;
associating the second composition data with a second graphics processor unit that is different from the first graphics processor unit;
determining a first frequency that corresponds to usage of the first model;
determining a second frequency that corresponds to usage of the second model;
determining that the first frequency is larger in value than the second frequency; and
storing the first model in the second graphics processor unit based on the determination that the first frequency is larger in value than the second frequency.

11. A system configured to associate composition data with a graphics processor unit, the system comprising:
a first central processor unit;
a second central processor unit;
a first graphics processor unit;
a second graphics processor unit; and
a dispatcher configured to be in communication with the first central processor unit, the second central processor unit, the first graphics processor unit, and the second graphics processor unit, wherein the dispatcher is configured to:
receive first composition data from the first central processor unit, wherein the first composition data corresponds to a first model;
associate the first composition data with the first graphics processor unit;
receive second composition data from the second central processor unit, wherein the second composition data corresponds to a second model;
associate the second composition data with the second graphics processor unit;
receive third composition data from the first central processor unit, wherein the third composition data corresponds to the second model;
determine that the second model is stored in the second graphics processor unit;
associate the third composition data with the second graphics processor unit based on the determination that the second model is stored in the second graphics processor unit;
receive fourth composition data that corresponds to a combination of the first model and the second model;
determine a first data cost that corresponds to transmission of the first model to the second graphics processor unit;
determine a second data cost that corresponds to transmission of the second model to the first graphics processor unit;
determine that the second data cost is larger than the first data cost; and
associate the fourth composition data with the second graphics processor unit based on the determination that the second data cost is larger than the first data cost and based on the determination that the second model is stored in the second graphics processor unit.

12. The system of claim 11, wherein the first central processor unit is configured to:
receive an identification from the dispatcher, wherein the identification corresponds to the first model;
generate hash data that corresponds to the first model; and
send the hash data and the first composition data to the dispatcher.

13. The system of claim 12, wherein the dispatcher is further configured to:
receive the hash data;
update a hash table in response to the received hash data; and
analyze the hash table,
wherein association of the first composition data with the first graphics processor unit is based on the received hash data and the analysis of the hash table.

14. The system of claim 11, wherein the first central processor unit is configured to:
receive an identification from the dispatcher, wherein the identification corresponds to the first model; and
send the first model to the dispatcher.

15. The system of claim 14, wherein the dispatcher is further configured to:
receive the first model;
send the first model to the first graphics processor unit;
generate hash data that corresponds to the first model; and
store the hash data in a memory of the dispatcher.

16. The system of claim 11, wherein:
the first graphics processor unit is configured to:
render a first frame based on the first composition data and the first model; and
send the first frame to a first end device; and
the second graphics processor unit is configured to:
render a second frame based on the second composition data and the second model; and
send the second frame to a second end device that is different from the first end device.

17. A composition data dispatcher configured to associate composition data with a graphics processor unit, wherein the composition data dispatcher comprises:
a processor configured to:

receive first composition data from a first processor unit, wherein the first composition data corresponds to a first model;

associate the first composition data with a first graphics processor unit;

receive second composition data from a second processor unit, wherein the second composition data corresponds to a second model;

associate the second composition data with a second graphics processor unit that is different from the first graphics processor unit;

receive third composition data from the first processor unit, wherein the third composition data corresponds to the second model;

determine that the second model is stored in the second graphics processor unit;

associate the third composition data with the second graphics processor unit based on the determination that the second model is stored in the second graphics processor unit;

receive fourth composition data that corresponds to a combination of the first model and the second model;

determine a first data cost that corresponds to transmission of the first model to the second graphics processor unit;

determine a second data cost that corresponds to transmission of the second model to the first graphics processor unit;

determine that the second data cost is larger than the first data cost; and associate the fourth composition data with the second graphics processor unit based on the determination that the second data cost is larger than the first data cost and based on the determination that the second model is stored in the second graphics processor unit.

18. The composition data dispatcher of claim 17, wherein the processor is configured to determine that the second model is stored in the second graphics processor unit based on analysis of hash data that corresponds to the first model and analysis of a hash table.

* * * * *